United States Patent [19]

Ely

[11] Patent Number: 5,117,091
[45] Date of Patent: May 26, 1992

[54] SOLDERING GUN

[76] Inventor: Laurice D. Ely, 660 W. 17th St. #29, Costa Mesa, Calif. 92627

[21] Appl. No.: 570,509

[22] Filed: Aug. 21, 1990

[51] Int. Cl.[5] .................. H05B 1/00; B23K 3/02
[52] U.S. Cl. .................... 219/236; 219/229; 219/239; 228/51
[58] Field of Search .............. 219/221, 227–242, 219/533; 228/51-55

[56] References Cited

U.S. PATENT DOCUMENTS

| | | |
|---|---|---|
| 1,415,479 | 5/1922 | Putnam . |
| 1,447,730 | 3/1923 | Post ......................... 219/238 |
| 1,701,858 | 2/1929 | Lamb . |
| 1,749,396 | 3/1930 | Schylander ............ 219/239 |
| 2,030,285 | 2/1936 | Dinyer ..................... 219/239 |
| 2,185,266 | 1/1940 | Raffles ..................... 219/239 |
| 2,498,328 | 2/1950 | Atkins ..................... 219/236 |
| 2,998,503 | 8/1961 | Wotton .................... 219/238 |
| 3,141,956 | 7/1964 | Schoenwald . |
| 4,687,903 | 8/1987 | Zimmerman . |
| 4,798,934 | 1/1989 | Boyer ................. 219/229 X |

FOREIGN PATENT DOCUMENTS

| | | | |
|---|---|---|---|
| 268631 | 4/1927 | United Kingdom ........ | 219/239 |
| 484651 | 5/1938 | United Kingdom ........ | 219/238 |

*Primary Examiner*—Anthony Bartis
*Attorney, Agent, or Firm*—Fleit, Jacobson, Cohn, Price, Holman & Stern

[57] ABSTRACT

A soldering gun is provided including an elongated tubular body of quartz having first and second ends. The first end of the body is telescoped into an outwardly opening recess provided therefore in a soldering iron tip mounted from the first end and a second shorter and smaller diameter quartz tubular member is telescoped into the end of the larger diameter tubular member from which the tip is supported. A coil of 6 to 12 turns of Ni Chrome wire is disposed about the second quartz tubular member within the first quartz tubular member and the end of the coil adjacent the tip is reversely turned and directed back through the second quartz tubular member to a point adjacent the other end thereof. A two conductor extension cord is telescoped through a tubular handle and into the end of the larger diameter quartz tube remote from the tip and has one conductor thereof electrically conductor to the Ni Chrome wire end within the small diameter tubular member and the other conductor thereof electrically connected to the adjacent coil end of the wire outwardly of the small diameter tubular member, one end of the tubular handle being telescoped over and secured to the end of the large diameter tubular member remote from the tip.

9 Claims, 1 Drawing Sheet

SOLDERING GUN

BACKGROUND OF INVENTION

1. Field of the Invention

This invention relates to a soldering gun specifically designed for electrical actuation from a low voltage current supply such as a 12 volt battery of suitable amperage capacity (such as a conventional automotive or boat battery.)

2. Description of Related Art

Various different forms of battery operated soldering guns or irons heretofore have been provided as well as other forms of electrically heated fusing implements including some of the general structural and operational features of the instant invention. Examples of these previously known devices are disclosed in U.S. Pat. Nos. 4,687,903, 3,141,956, 2,498,328, 1,701,858 and 1,415,479. However, these previously known forms of electrically heated implements do not include some of the more specific structural and operational features of the instant invention which coact to provide an apparatus which is effective in operation and may be manufactured at a low cost and still be dependable in operation and include a long operating life.

SUMMARY OF THE INVENTION

The soldering gun or iron of the instant invention incorporates five components (other than the extension cord portion thereof) which may be readily joined together in order to effect a finished product and the assembly of only two of the components operations.

The soldering iron incorporates a heat resistant quartz tubular member for the body thereof and upon whose forward end a copper soldering tip is mounted and upon whose rear end a heat insulated handle is mounted. An extension cord extends longitudinally through the handle, into the quartz tubular member and one conductor of the extension cord extends into the interior of a second smaller diameter quartz tubular member and is electrically connected to a lead end of a Ni Chrome wire within the adjacent end of the small diameter quartz tubular member. The lead end of the Ni Chrome wire (heating element) extends through the small diameter quartz tubular member, out of the remote end thereof and then is coiled about the exterior of the small diameter quartz tubular member back toward the first mentioned end thereof and the second conductor of the extension cord is electrically connected to the end of the coiled portion of the Ni Chrome wire on the exterior of the small diameter tubular member in a manner such that the two conductor ends of the extension cord are electrically connected to the opposite ends of the Ni Chrome wire in a manner totally insulated from each other by the small diameter quartz tubular member. The coiled portion of the Ni Chrome wire includes between 6 to 12 turns on the exterior of the small diameter tubular member in order to provide sufficient heat while avoiding excessive burnout heat.

The main object of this invention is to provide a soldering gun or iron which may be actuated by an automotive or marine battery in locations remote from sources of higher voltage electrical potential.

Another object of this invention is to provide a soldering gun or iron of low amperage requirement, but which may be utilized to perform substantially all automotive, boat and hobby craft soldering operations.

Still another very important object of this invention is to provide a soldering gun or iron having an extremely long life of operation.

A final object of this invention to be specifically enumerated herein is to provide a soldering gun in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
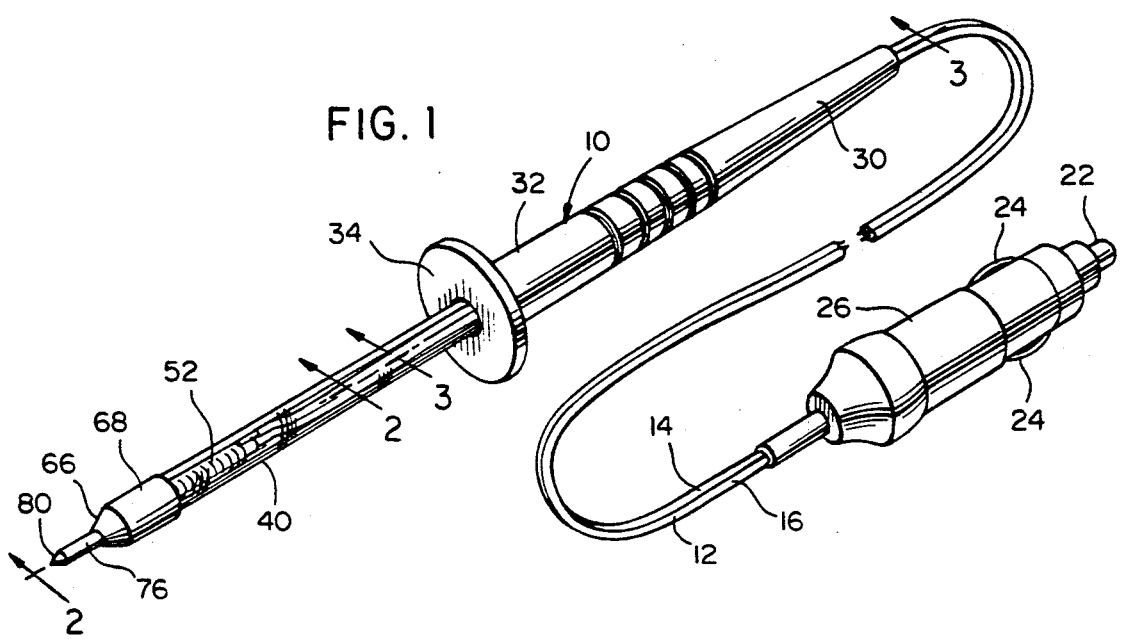
FIG. 1 is a perspective view of a soldering gun constructed in accordance with the present invention.

Referring now more specifically to the drawings the numeral 10 generally designates the soldering iron or gun of the instant invention. The iron 10 includes an extension cord 12 incorporating two insulated conductors 14 and 16. The conductors 14 and 16 include electrically conductive cores 18 and 20 and one pair of corresponding ends of the cores 18 and 20 are electrically connected to the center and side contacts 22 and 24 of a fused cigarette lighter receptacle plug 26, which plug 26 is of conventional design.

The iron 10 further includes a tubular handle 28 open at its opposite ends and constructed of dielectric, shape retentive, heat insulative and somewhat resilient material. The handle 28 includes a first end portion 30 and a second end portion 32, the second end portion 32 including an integral diametrically enlarged flange 34. In addition, the interior of at least the second end portion 32 includes radially inwardly projecting integral splines 36 for purpose to be hereinafter more fully set forth.

The iron 10 also includes a main body comprising an elongated large diameter quartz tubular member 40 having first and second ends 42 and 44 as well as a second smaller diameter quartz tubular member 46 having first and second ends 48 and 50.

Also, a Ni Chrome wire resistance heating element 52 is provided and includes a straight lead end 54 which extends almost entirely through the tubular member 46. The core 20 of the conductor 16 extends into the second end 50 of the tubular member 46 and is electrically connected as at 56 to the straight lead end 54 of the Ni Chrome wire resistance heating element 52. The straight lead end 54 projects outwardly of the first end 48 of the small diameter tubular member 46 and is reversely turned as at 58 and then coiled about and back along the exterior of the tubular member 46 as at 60, the coiled portion of the Ni Chrome wire resistance heating element 52 including between 6 and 12 turns about the small diameter tubular member 46.

Figure 2:
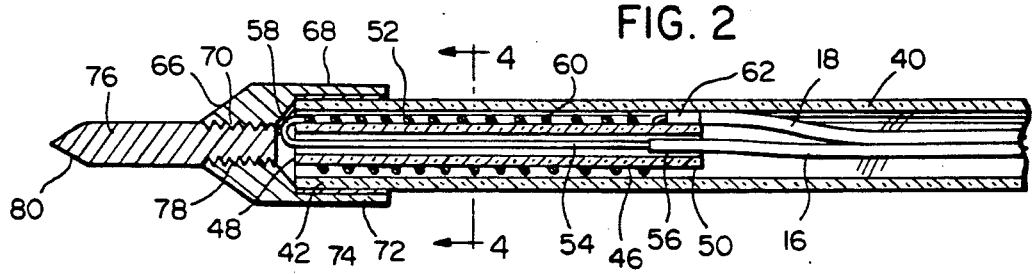
FIG. 2 is an enlarged fragmentary vertical sectional view taken substantially upon the plane indicated by the section line 2—2 of FIG. 1.

The core 18 of the conductor 14 is electrically connected as at 62, exteriorly of the small diameter tubular member 46 to the end of the coiled portion of the Ni Chrome wire resistance heating element 52 remote from the reversely turned portion 58 thereof and the heater assembly comprising the small diameter tubular member 46, the resistance heating element 52 and the adjacent ends of the conductors 16 and 18 is loosely slidably received into the second end 44 of the quartz tubular member 40, along the latter toward the first end 42 of the tubular member 40 and to the position thereof illustrated in FIG. 2 with the first ends 42 and 48 of the tubular members 40 and 46 substantially registered with each other. Of course, before telescoping the tubular member 46, the resistance heating element 52 and the adjacent ends of the conductors 16 and 18 into the second end 44 of the tubular member 40, they are telescoped through the handle 28 from the first end portion 30 thereof.

A soldering tip 66 is carried by the first end 42 of the quartz tubular member 40. The tip 66 includes a sleeve portion having a threaded bore 70 formed therethrough and the threaded bore 70 includes an enlarged, smooth counterbore at one end of the tip 66 defining a sleeve open end into which the first end 48 of the quartz tubular member 40 is telescoped and secured through the utilization of heat resistant attaching cement 74. The tip 66 also includes an elongated probe-type shank 76 which is threaded on one end as at 78 and removably threaded into bore 70, the other end of the shank 76 including a conical point 80 (or any other suitably shaped soldering point.)

The exterior diameter of the quartz tubular member 40 is slightly greater than the diameter of a cylindrical area coinciding with the radial inward most portion of the splines 36 and, as the splined interior of the second end portion 32 of the handle 28 is forceably telescoped over the second end 44 of the quartz tubular member 40 the innermost portions of the splines 36 are deformed and serve to tightly frictionally engage the contacted outer surface portions of the second end portion 44 of the quartz tubular member 40 telescoped into the handle 28.

Figure 3:
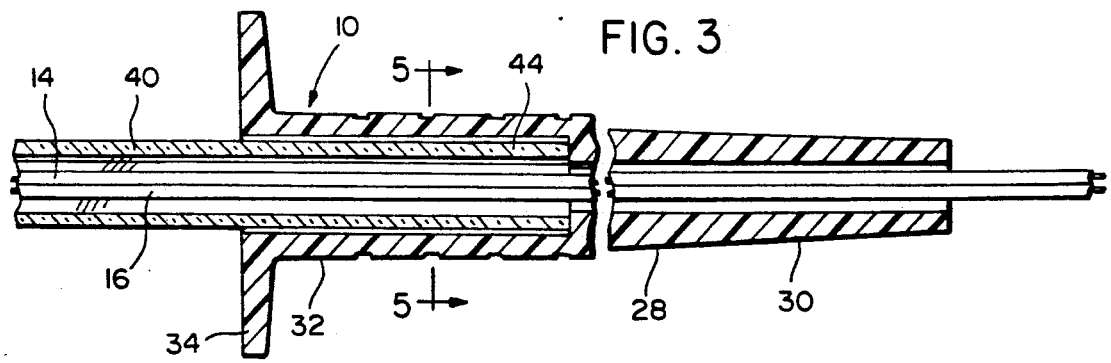
FIG. 3 is an enlarged fragmentary vertical sectional view taken substantially upon the plane indicated by the sectional line 3—3 of FIG. 1.
Figure 4:
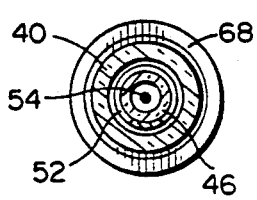
FIG. 4 is a transverse vertical sectional view taken substantially upon the plane indicated by the section line 4—4 of FIG. 2.
Figure 5:
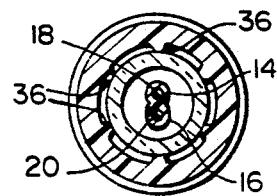
FIG. 5 is a transverse vertical sectional view taken substantially upon the plane indicated by the section line 5—5 of FIG. 3.
Figure 6:
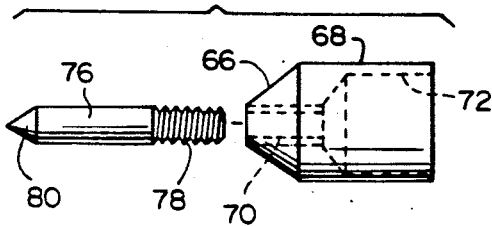
FIG. 6 is an enlarged exploded side elevational view of the tip of the soldering iron.

The splined interior of the second end portion 32 of the handle 28 is larger in diameter than the remaining portion of the interior of the handle 28. If it is desired, once the components of the soldering iron or gun 10 have been assembled in the manner illustrated in FIGS. 2 and 3, suitable elastic cement or the like (not shown) may be placed about the conductors 16 and 18 within the interior of the first end portion 30 of the handle 28 in order to releaseably prevent a pull on the extension cord 12 from withdrawing the assembly comprising the tubular member 46 and the resistance heating element 52 from within the quartz tubular member 40.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A soldering gun including a first larger diameter elongated tubular member of high heat resistant dielectric material and having first and second open opposite ends, a second smaller diameter elongated tubular member of high heat resistant dielectric material and having first and second open opposite ends, said second tubular member being considerably shorter in length than said first tubular member and being lengthwise loosely telescoped into said first tubular member with said first ends being generally flush with each other and an annular space defined between said tubular members, and open coil of resistance heating wire loosely coiled about said second tubular member in said annular space, one end of said coil adjacent the second end of said second tubular member being disposed in said annular space and having the first end of the electrically conductive core of a first insulated conductor electrically connected thereto within said space, the other end of said coil adjacent the first end of said second tubular member extending outwardly thereof and being reversely bent back into the interior of said second tubular member and extending therethrough to a point adjacent the second end of said second tubular member and having the first end of the electrically conductive core of a second insulated conductor electrically connected thereto within said second tubular member, an elongated soldering tip defining a sleeve open end on one end thereof, said first end of said first tubular member being telescopingly received and secured within said sleeve open end, a tubular handle, one end of said tubular handle being telescoped over and secured to said second end of said first tubular member, said first and second insulated conductors extending outwardingly of said second end of said first tubular member, through said tubular handle and outwardly of the other end thereof and being adapted for electrical connection of the second ends of said cores with a suitable source of low voltage electrical potential.

2. The gun of claim 1 wherein said resistance heating wire includes resistance to the flow of electric current there through suitable to heat said tip to a temperature capable of melting solder.

3. The gun of claim 2 wherein said coil includes between 6 to 12 coils about said tubular member.

4. The gun of claim 3 wherein said tip is constructed, primarily, of copper.

5. The gun of claim 1 wherein said tip includes an elongated probe-type shank on the end thereof remote from said one end of said tip.

6. The gun of claim 5 wherein said probe-type shank is removably supported from the end of said tip remote from said sleeve open end.

7. The gun of claim 1 wherein the interior of at least said one end of s id tubular handle includes radially inwardly projecting integral internal splines, said handle being constructed of heat insulative, stiff but slightly resilient material, said second end of said first elongated tubular member being slightly larger in outside diameter than a cylindrical area defined by the innermost extremeties of said splines, said second end of said first elongated tubular member slightly deforming and defining a friction gripping action with the inner portions of said splines.

8. The gun of claim 7 wherein said coil includes between 6 to 12 coils about said tubular member.

9. The gun of claim 8 wherein said tip includes an elongated probe-type shank on the end thereof remote from said one end of said tip, said probe-type shank being removably supported from the end of said tip remote from said sleeve open end.

* * * * *